United States Patent [19]

Murphy et al.

[11] Patent Number: 4,500,967
[45] Date of Patent: Feb. 19, 1985

[54] AIRCRAFT SHORT-TERM ROLL ATTITUDE RETENTION SYSTEM

[75] Inventors: Richard D. Murphy, Trumbull; Ricardo L. Perez, Southington; Douglas H. Clelford, Trumbull, all of Conn.

[73] Assignee: United Technologies Corporation, Hartford, Conn.

[21] Appl. No.: 325,391

[22] Filed: Nov. 27, 1981

[51] Int. Cl.³ .................... G06F 15/50; B64C 11/00
[52] U.S. Cl. .................................. 364/434; 244/178
[58] Field of Search ............ 364/434, 435; 244/178, 244/179, 17.13

[56] References Cited

U.S. PATENT DOCUMENTS

| | | | |
|---|---|---|---|
| 3,921,941 | 11/1975 | Lehfedt | 244/178 |
| 4,371,936 | 2/1983 | Adams et al. | 364/434 |
| 4,371,939 | 2/1983 | Adams et al. | 364/434 |
| 4,385,355 | 5/1983 | Verzella et al. | 244/17.13 |

Primary Examiner—Jerry Smith
Assistant Examiner—Michael R. Fleming
Attorney, Agent, or Firm—M. P. Williams

[57] ABSTRACT

An automatic flight control system, for an aircraft having a roll attitude retention outer loop actuator (29), a roll stability inner loop actuator (25) and a control stick (26) for positioning control surfaces of the aircraft to control its roll attitude, includes means (54, 55) to provide a roll error signal (56) indicative of the deviation in roll attitude from a desired roll attitude. The roll attitude retention outer loop actuator (29) is controlled by a proportional (61) and integral (62) function of the roll error when force is not applied to the stick, but only as a proportional function when force is applied to the stick (48, 49, 51, 62). The roll stability inner loop actuator is controlled by a washed out (72) proportional (64) function of the roll error signal to provide short-term roll retention at roll attitudes established by the control stick during turns against trim. Sensing force on the stick (51, 95, FIG. 1) and roll attitude of a predetermined threshold magnitude (107) provides adjustments in relative gain (113, 117, 70, 71, FIG. 1; 154, 157, 160-163, FIG. 4) during turns against trim.

3 Claims, 4 Drawing Figures

AIRCRAFT SHORT-TERM ROLL ATTITUDE RETENTION SYSTEM

DESCRIPTION

1. Technical Field

This invention relates to aircraft automatic flight control systems, and more particularly to provision of roll stability during turns against trim.

2. Background Art

It has long been known to provide automatic flight control systems (sometimes referred to as automatic pilots) to control the attitude, altitude, heading and speed of aircraft in flight, particularly at cruise speeds. Typical automatic flight control systems used in both fixed wing aircraft and rotary wing aircraft (helicopters) include a roll attitude retention system in which a desired roll attitude is maintained in response to deviations of the roll axis output of a vertical gyro from a desired roll attitude established in a synchronizer. When trim is released, the synchronizer achieves a signal level equal to that provided by the vertical gyro. When trim is reengaged, any deviation of the vertical gyro (due to a change in aircraft roll attitude) causes an output signal which in turn adjusts the positioning of the aircraft control surfaces so as to correct the roll attitude. The value stored in the synchronizer can be adjusted without releasing trim by means of a "beeper", which simply slews the reference value stored in the synchronizer in one direction or another when the beeper is depressed.

At cruise speeds, the normal aircraft turn is made by rolling the aircraft in the direction of desired turn, and introducing sufficient yaw so as to coordinate the turn (causing the summation of the gravity vector and the centrifugal force vector to be perpendicular to the aircraft floor during the turn). If a turn is to be substantial, the pilot may depress trim release, roll the aircraft to a desired roll angle, and disengage trim release to cause resynchronization at the desired roll angle; at the conclusion of the turn, the pilot may depress trim release, maneuver the craft back to a wings-level attitude and again disengage the trim release so as to resynchronize in the wings-level attitude. In some automatic flight control systems, a feature called autobank may automatically provide trim release so as to resynchronize at the desired turning roll angle and again when returned to wings-level attitude. In either manual or autobank turns in which the turn is stabilized by synchronizing at the turn roll angle, the synchronizer naturally loses the wings-level reference value when it is resynchronized during the turn. That reference must be reacquired in the synchronizer after the turn is completed. Of course, a wings-level attitude is a special case: the output of the vertical gyro roll axis is zero when the wings are level. A perfectly coordinated turn feels exactly the same as balanced, straight flight (without sideslip). Therefore, the knowledge of being in a turn is verifiable only by means of instruments (the vertical gyro which indicates the bank angle, the compass which shows a continuous change in heading), as well as visual cues (attitude with respect to sky and earth). For this reason, it is common for pilots to make turns against trim during IFR flight, when visual cues are inadequate. With the roll retention portion of an automatic flight control system engaged, if the pilot does not press trim release, lateral movement of the stick to cause a change in roll attitude in order to make a turn is achieved only by overcoming detent and gradient force on the stick. The pressure of the stick against the pilot3 s hand is therefore a viable cue concerning the direction and magnitude of the turn.

When pilots maneuver extensively under IFR conditions, the lack of visual cues to the pilot's own nervous system can cause vertigo and disorientation. For instance, maneuvering at night in fog commonly results in vertigo and disorientation. During a series of turns in opposite directions, the pilot may forget which direction he is turning, and may misread or distrust the instruments as a consequence of vertigo. He may, therefore, in attempting to return to wings-level, increase his roll angle rather than decrease it, by mistake. In nap-of-the-earth flying, this could easily result in causing the aircraft to contact the earth (crash). In the case of helicopters, the excessive roll could take the helicopter out of its flight envelope, causing catastrophic loss of contol. Therefore, flight against trim is advantageous during IFR conditions since release of the stick will automatically cause the wings-level trim attitude to be reachieved by the automatic flight control system.

During normal, wings-level flight, or during a normal turn in which the automatic flight control system is to maintain a desired roll attitude, there must be sufficient gain and response to overcome gusts of wind and other perturbations to keep the aircraft in the desired roll attitude. In most cases, the gain required for normal, stabilized flight is sufficiently high that release of the stick during a turn against trim will cause the aircraft to roll towards wings-level at an excessive rate. Further, in most aircraft, it is difficult to maintain a desired roll attitude without the stabilizing assistance of an automatic flight control system. In helicopters, it is particularly likely, for any given helicopter, that the pilot will find it difficult to maintain a roll angle over a period of time in the presence of wind gusts and other disturbances. Even though roll rates induced by wind gusts and other perturbations may be compensated by means of inputs from a roll rate gyro, the integrated effect of roll rate perturbations must be compensated for by the pilot. And, there are other possible long-term drifts in roll attitude (such as cross coupling effects). Therefore, it can be very difficult for a pilot (causing a large pilot workload and in fact contributing additionally to vertigo) to make turns against trim in IFR flights.

DISCLOSURE OF INVENTION

Objects of the invention include provision of roll attitude stability during aircraft turns made by a pilot against trim (against a roll attitude reference in an automatic flight control system), and provision of controlled, automatic return to a wings-level trim position when force is removed from the control stick during a turn against trim.

According to the present invention, an automatic flight control system of an aircraft having a roll retention outer loop and a roll stability inner loop is provided short-term attitude stability, in turns against trim at cruise speeds, by means of a washed-out function of vertical gyro roll axis variations being applied to the inner loop stability actuator, the gain between the outer loop attitude retention servo command and the washed-out stability command being adjusted to cause a controlled return to wings-level when lateral force is removed from the stick at the end of the turn against trim. According further to the invention, in turns against trim, the outer loop roll attitude retention channel is provided with increased gain and the roll inner loop stability channel is provided with decreased gain. In still further accord with the invention, gain adjustments are made in turns against trim and at the end thereof in a gradual fashion in response to a fade signal; the fade signal is controlled in turn by logic which recognizes that the trim is engaged, without beeping or trim release, that there is force on the stick against the trim position and that a non-level attitude has been commanded by the pilot. When force is removed from the stick, by virtue of the roll attitude retention outer loop overcoming the roll stability inner loop, normal level flight gains are reestablished once the roll attitude is within some predetermined angle of wings-level flight and the yaw rate is small.

The heart of the invention is utilization of a washout filter so that only short-term variations in the roll synchronizer output (the output being considerable when the pilot rolls the aircraft against the wings-level trim position) are applied to the inner loop stability actuator. The large, steady error has no effect due to the washout filter. As the pilot holds the stick in attempting to maintain a constant roll angle in a turn, the synchronizer output is constant; but should the control system drift or the aircraft receive perturbations (such as a consequence of wind gusts), the change in the synchronizer output will immediately cause compensation to the inner loop actuator. Thus, when the pilot is controlling a turn against trim with the control stick, the inner loop stability actuator will provide compensation for short-term attitude variations (in addition to compensation for roll rate variations sensed by a roll rate gyro). This considerably eases the pilot workload and allows the relatively safe turn against trim (during IFR flight) with low pilot workload. When flying a turn against trim, the control stick dominates in the long term because the outer loop attitude retention servomechanism is driven by a roll angle-limited signal, which simply provides a steady bias that the pilot must overcome to achieve the desired roll angle. But when the pilot lets go of the stick, the limited output of the synchronizer applied to the outer loop attitude retention servomechanism has higher gain and therefore dominates the inner loop stability actuator, thus causing the aircraft to return to the wings-level trim position being maintained by the synchronizer. Thus, the invention also provides a controlled return to wings-level at the conclusion of a turn against trim.

The invention is readily implemented in automatic flight control systems of the type known to the art, whether wholly analog, or partially digital or computer controlled in nature, in the light of the teachings which follow hereinafter.

The foregoing and other objects, features and advantages of the present invention will become more apparent in the light of the following detailed description of exemplary embodiments thereof, as illustrated in the accompanying drawings.

BEST MODE FOR CARRYING OUT THE INVENTION

Figure 1:
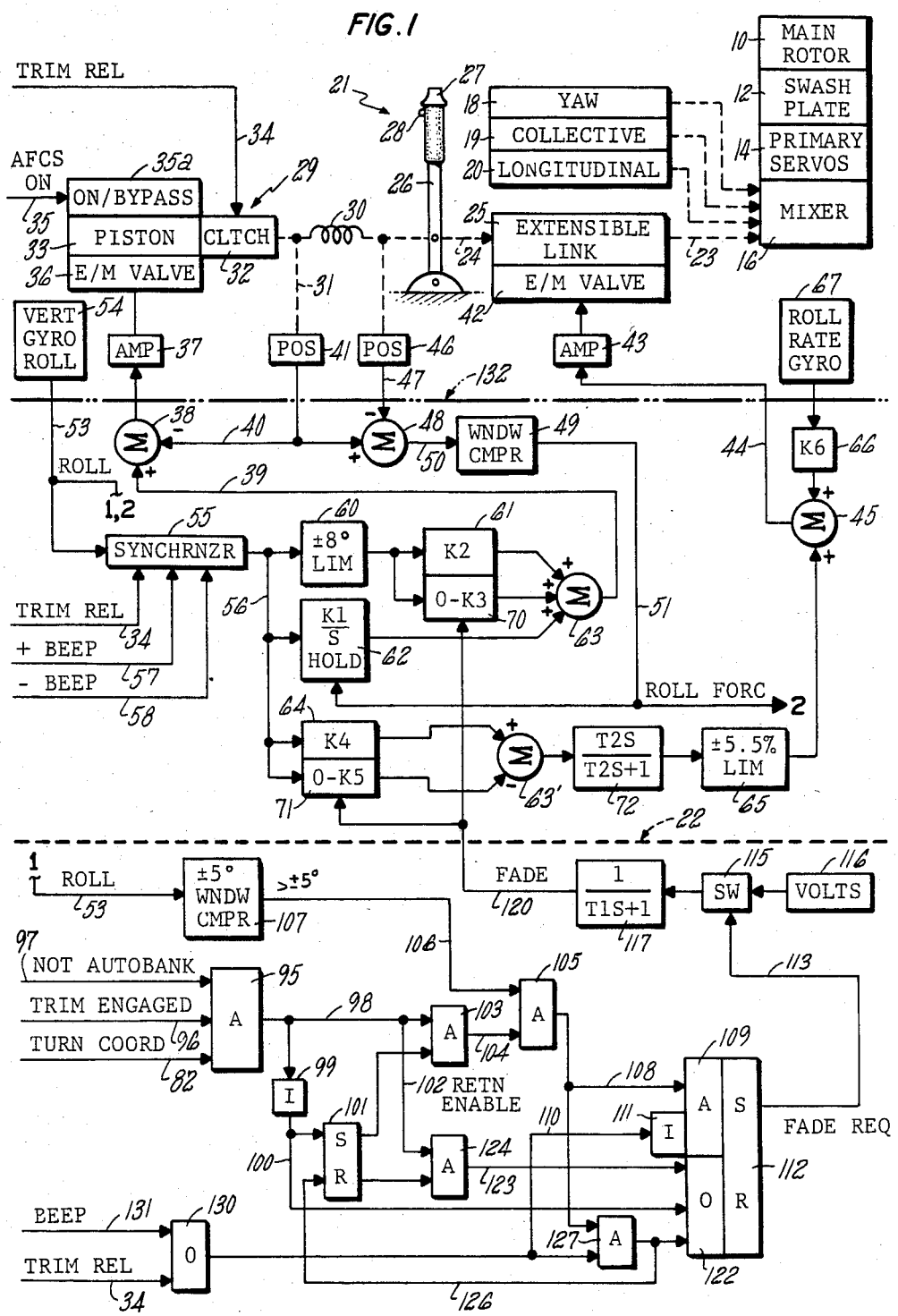
FIG. 1 is a simplified schematic block diagram of a lateral cyclic pitch (roll) stability channel of a helicopter automatic flight control system incorporating the present invention.

Referring to FIG. 1, the pitch angle of the blades of the main rotor 10 of a helicopter are cyclically and collectively adjusted by rotation against a swashplate 12 which is positioned by primary servos 14 in response to a mixer 16 which receives inputs from a yaw channel 18, collective pitch channel 19, a longitudinal cyclic pitch (pitch attitude) channel 20 and a lateral cyclic pitch (roll attitude) channel 21, which comprises essentially all the remaining matter disclosed in FIG. 1 above a dotted line 22. The roll input to the mixer 16 is a mechanical connection 23 which can be varied ±10% from the position of a linkage 24 by means of an extensible link 25. The extensible link 25 is typically very fast, capable of a complete excursion across its operating range in a small fraction of a second. The linkage 24 is positionable by the lateral movement of a cyclic pitch control stick 26 which has a beeper switch 27 and a trim release switch 28 disposed thereon. The linkage 24 and stick 26 can, in turn, be positioned by a roll retention hydraulic servo 29 through a resilient connection, such as a spring 30. The spring 30 is connected through linkage 31 and a clutch 32 to the main piston 33 of the servo 29. The clutch can be disengaged by a trim release signal on a line 34 which is generated in response to pressing the cyclic pitch trim release switch 28. When the automatic flight control system is not turned on, the piston 33 operates in a bypass mode to supply hydraulic damping to the linkage 31 through the clutch 29. When the automatic flight control system is turned on by a signal on a line 35, the piston 33 is positionable by an electromagnetic valve 36 which is driven by a servo amplifier 37 in response to the output of a summing junction 38 which drives the amplifier in accordance with the difference between a desired position indicated by a signal on a line 39 and an actual position signal on a line 40 derived from a position sensor 41 (such as a potentiometer or a linear variable differential transformer) connected to the linkage 31. Similarly, the extensible link 25, if hydraulic, is operable in response to an electromechanical valve 42 driven by an amplifier 43 in response to a position signal on a line 44 provided by a summing junction 45. The extensible link 25 could be an electric jackscrew. A second position detector 46 provides a signal on a line 47 indicative of the position of the linkage 24. Comparison of the signal on the lines 40 and 47, such as by subtraction in a summing junction 48, provides an indication of the extent to which the stick 26 is being positioned against the position established by the piston 33 for the linkage 31 (against the force of the spring 30). A window comparator 49 is responsive to the output from the summing junction 48 on a line 50 and will provide a roll force signal on a line 51 whenever the relative positions of the linkages 24, 31 indicate that some predetermined magnitude of force is being applied by the stick 26 against the trim position established in the linkage 31, such as ±2 pounds. The roll force signal on the line 51 is an indication that the pilot is controlling the roll attitude of the aircraft against the trim position established by the servo actuator 29.

Long-term roll attitude retention is achieved in response to a roll angle signal on a line 53 derived from the roll axis output of a vertical gyro 54. This signal is applied to a synchronizer 55 of a known type, the output of which on a line 56 is indicative of the deviation in aircraft roll attitude from a desired roll attitude established in the synchronizer 55, in a well known fashion. When the trim release signal is present on the line 34, the synchronizer 55 will establish the desired roll attitude signal as the current roll signal on the line 53. This can later be changed by again providing the trim release signal on the line 34, or by adjusting the desired attitude by means of a plus beep signal on a line 57 or a minus beep signal on a line 58, which are derived from right or left operation of the beeper switch 27 on the cyclic pitch control stick 26. The roll error signal on the line 56 is applied to a limiter 60 which limits the signal in a fashion that proportional inputs through an amplifier 61 will drive the servo actuator 29 no more than will command an 8° roll change at any point in time. The roll error signal on the line 56 is also provided to an integrator 62, the output of which is summed with that of the amplifier 61 in a summing junction 63. The integrator provides long-term null stability in the well known fashion. The output of the summing junction 63 comprises the position command signal on the line 39. When the pilot rolls the aircraft against trim, the roll force signal on the line 51 will cause the integrator 62 to hold a constant output; this may be achieved by causing the signal on the line 51 to open the input to the integrator 62, in a well known fashion.

Shorter term stability is provided by utilizing a roll error output on the line 56 through a proportional channel including an amplifier 64 and a limiter 65 to the input of the summing junction 45. The summing junction 45 also receives a signal from an amplifier 66 responsive to a roll rate gyro 67 which provides short-term rate stability to the aircraft through the inner loop stability actuator 25. In normal flight, roll attitude rates and short-term errors in roll attitude are compensated by the inner loop through the amplifiers 64 and 66 and these errors are taken out long term by the amplifier 61 and integrator 62 through the roll attitude stability servo actuator 29.

The description thus far is of a typical automatic flight control system roll channel, as applied to a helicopter. In order to incorporate the present invention, relatively little must be added to the roll channel as described. Specifically, incorporation of the present invention requires the addition of a pair of variable gain amplifiers 70, 71, connected to summing junctions 63 and 63', and a wash-out filter 72. In addition, logic circuitry necessary to control the adjustment in gain of the amplifiers 70, 71, according to the present invention, is illustrated below the dotted line 22 in FIG. 1.

Figure 2:
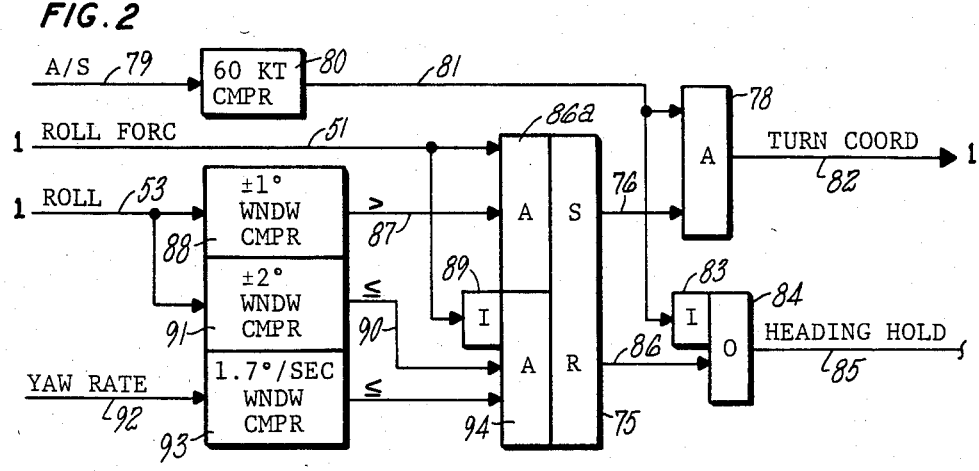
FIG. 2 is a simplified schematic block diagram of illustrative circuitry for selecting turn coordination and heading hold functions.

For a better understanding of the logic circuitry at the bottom of FIG. 1, the selection between turn coordination and heading hold functions should be appreciated. Referring to FIG. 2, a simplified, exemplary circuit for selecting between turn coordination and heading hold functions includes a bistable device 75 which, when set, provides a signal on a line 76 to an AND circuit 78. When the airspeed of the aircraft, as indicated by a signal on a line 79, is greater than a predetermined threshold cruise speed, such as 60 knots, a comparator 80 will provide a cruise speed signal on a line 81. When the bistable device 75 is set and the cruise speed signal is present on the line 81, then a turn coordination mode signal will be present at the output of the AND circuit 78 on a line 82. If the cruise speed signal is not present on the line 81, an inverter 83 will cause an OR circuit 84 to generate a heading hold signal on a line 85. Similarly, at any speed, if the bistable device 75 is reset, a signal on a line 86 will cause the OR circuit 84 to generate the heading hold signal on a line 85.

For the bistable device 75 to be set, thus indicating turn coordination, the roll force signal must be present on the line 51 concurrently with a signal on a line 87 indicating that the roll attitude of the aircraft is more than one degree off of wings-level, as determined by a ±1° window comparator 88 responsive to the roll output of the vertical gyro on line 53. Once the bistable device 75 is set so as to indicate turn coordination, it will not become reset until disappearance of the roll force signal on the line 51, as indicated by an inverter 89, concurrently with the roll attitude returning to within two degrees of wings-level, as indicated by a signal on a line 90 from a ±2° window comparator 91, and the yaw rate of the aircraft, indicated by a signal on a line 92 from a yaw rate gyro, being less than 1.7° per second (or so) as determined by a window comparator 93. The turn coordination and heading hold modes are concerned primarily with the manner in which the yaw channel is controlled: when not in turn coordination, the yaw channel controls the heading of the aircraft in response to a directional gyro or compass; but when in turn coordination mode, the yaw axis is controlled so as to provide the correct amount of yaw input at the bank angle and speed of the aircraft for a perfectly coordinated turn (net force vector normal to the floor of the aircraft). As concerns the present invention, the turn coordination signal on the line 82, since it indicates diversion from wings-level as a consequence of force on the stick, and return toward wings-level with a small yaw rate in the absence of force on the stick, can be used to control the logic for implementing the present invention.

Referring to the bottom of FIG. 1, an AND circuit 95 responds to concurrence of the turn coordination signal on the line 82 with a signal on a line 96 indicating that trim is engaged (that is, the outer loop of the automatic flight control system is on and operative) and a signal on a line 97 indicating that the autobank feature is not turned on. As described briefly hereinbefore, when the autobank feature is on, it automatically retrims the synchronizer once a fixed roll attitude (roll rate very low) has been achieved during a pilot induced turn, and again retrims the system when the pilot causes it to roll back to nearly the wings-level situation. When autobank is being employed, the present invention cannot be. In a typical case, autobank would be used to ease pilot workload while making turns during VFR conditions since the pilot will have no difficulty returning the aircraft to nearly a wings-level situation by force on the stick in completion of a turn. But during IFR conditions, the present invention would be employed and the autobank feature would be shut off.

When less than all of the conditions of the AND circuit 95 are satisfied, the absence of a signal on a line 98 will cause the inverter 99 to set a bistable device 100 which enables operation of the short-term roll attitude retention feature of the present invention. Thus, when the aircraft is first started up and trim is not engaged, or during acceleration of the aircraft toward cruise speed when turn coordination could not be engaged, the AND circuit 95 will not operate so the inverter 99 will provide a signal on a line 100 to set the bistable device 101. Thereafter, with the trim engaged and cruise speed achieved, should the pilot apply lateral force to the cyclic stick 26, the roll force signal on a line 51 (FIG. 2) together with a one degree roll will cause the turn coordination signal to appear on the line 82. The AND circuit 95 (FIG. 1) will then provide a signal oh a line 98 which together with the retention enable signal on the line 102 will cause an AND circuit 103 to provide a signal on a line 104. This enables an AND circuit 105 so that it may operate provided a signal on a line 106 indicates that the roll attitude now deviates by 5° from wings-level as determined by a ±5° window comparator 107 which is responsive to the roll signal on the line 53.

When the AND circuit 105 operates, it will provide a signal on a line 108 to enable an AND circuit 109. Provided there is no signal on a line 110, an inverter 111 will allow the AND circuit 109 to operate and set a fade request bistable device 112. When set, the bistable device 112 provides a fade request signal on a line 113 which is utilized to adjust the gain of the amplifiers 70, 71. One form of gain adjustment, as illustrated in FIG. 1, simply utilizes the fade request signal on the line 113 as a discrete signal to operate a switch 115 which connects voltage from a suitable source 116 to a lag filter 117. The voltage 116 is selected so as to provide an input signal to the variable gain amplifiers 70, 71 such that maximum gain (K3, K5) is effected by the magnitude of the voltage from the source 116. When the switch 115 is initially closed, the output of the lag filter, comprising the fade signal on a line 120, increases from zero exponentially, initially at a high rate and thereafter at a continuously decreasing rate of increase. By choosing a time constant (T1) of about one second, the gain of the amplifiers 70, 71 will be increased from zero, gradually, to substantially full gain in about three seconds. In a similar fashion, when a turn against trim is completed and the bistable device 112 becomes reset (in a manner described below), the fade request signal on the line 113 will disappear, so the switch 115 will open applying no voltage to the lag filter 117. This will cause the fade signal on the line 120 to decrease exponentially to zero, causing the gain of the amplifiers 70, 71 to again be zero. An alternative method of using the fade signal on the line 120 to provide variable gain amplifiers includes a constant gain amplification stage preceded by a multiplier stage whereby the signal input to the amplifier would be multiplied by between zero and one, the transitions therebetween being controlled exponentially by the filter 117.

Once short-term retention for a turn against trim is in fact established by setting the bistable device 112, the bistable device 112 will remain set (in the normal case) until the turn against trim is ended by the pilot removing lateral force on the cyclic pitch stick 26. Referring to FIG. 2, absence of the roll force signal on the line 51 will cause the inverter 89 to enable the AND circuit 94 to be responsive to signals indicative of a roll attitude of less than 2° and a yaw rate of less than 1.7° per second. As the coordinated turn nears completion, the wings will nearly be level and little yaw rate will be required to coordinate the turn. Therefore, the conditions of the AND circuit 94 will be satisfied, causing the bistable device 75 to be reset, so that the turn coordination signal on the line 82 disappears. In FIG. 1, this blocks the AND circuit 95 so that the absence of the signal on the line 98 causes the inverter 99 to provide a signal on the line 100 to an OR circuit 122 which resets the bistable device 112. The OR circuit 122 can also be operated by a signal on a line 123 provided by an AND circuit 124 whenever the retention enable bistable device 101 is reset concurrently with presence of the signal on the line 98. This ensures that if the enable condition is lost, the fade request bistable cannot again become set until the enable condition is reestablished. The only way of causing the retention enable bistable device 101 to become reset is by means of a signal on a line 126 provided by an AND circuit 127 in response to the signal on the line 110 which is generated by an OR circuit 130 whenever there is a trim release signal on the line 34 or a beep signal (derived from the plus beep and minus beep signals on the lines 57, 58) on a line 131.

Each time that a turn against trim is completed, ultimately the turn coordination signal on line 82 will disappear (as described with respect to FIG. 2) causing the signal on the line 98 to disappear. The inverter 99 will cause the signal on the line 100 to reset the fade request bistable 112, thus terminating the fade request so that the gain adjustments will be faded out and normal operation will resume with nominal gain (K2, K4 alone). But notice that the retention enable bistable 101 is not reset in this process; therefore, the pilot may again make a turn against trim and engage the features of the present invention. If during the turn against trim the beeper is pressed or the trim release switch is pressed so that the signal appears on the line 126, and the retention enable bistable device 101 is reset, this device cannot again become set until the aircraft resumes a wings-level condition so that the turn coordination signal on the line 82 disappears. This will cause loss of the signal 98 so that the inverter 99 will again set the retention enable bistable device 101 and the process can repeat itself, as necessary. And, if the pilot desires to use the autobank mode on some turns and the invention on other turns, switching in and out of autobank will reenable the retention enable bistable device 101.

All of the functions described in FIG. 1 below the dot/dash line 132 and the functions illustrated briefly in FIG. 2 are all implementable by dedicated circuitry, either analog or digital or both, or are implementable by a digital computer interfacing suitably with the portion of the system illustrated above the dot/dash line 132 in FIG. 1. As an example, U.S. Pat. No. 4,270,168 discloses a dual computer automatic flight control system illustrative of an actual system in which the present invention has in fact been implemented.

Figure 3:
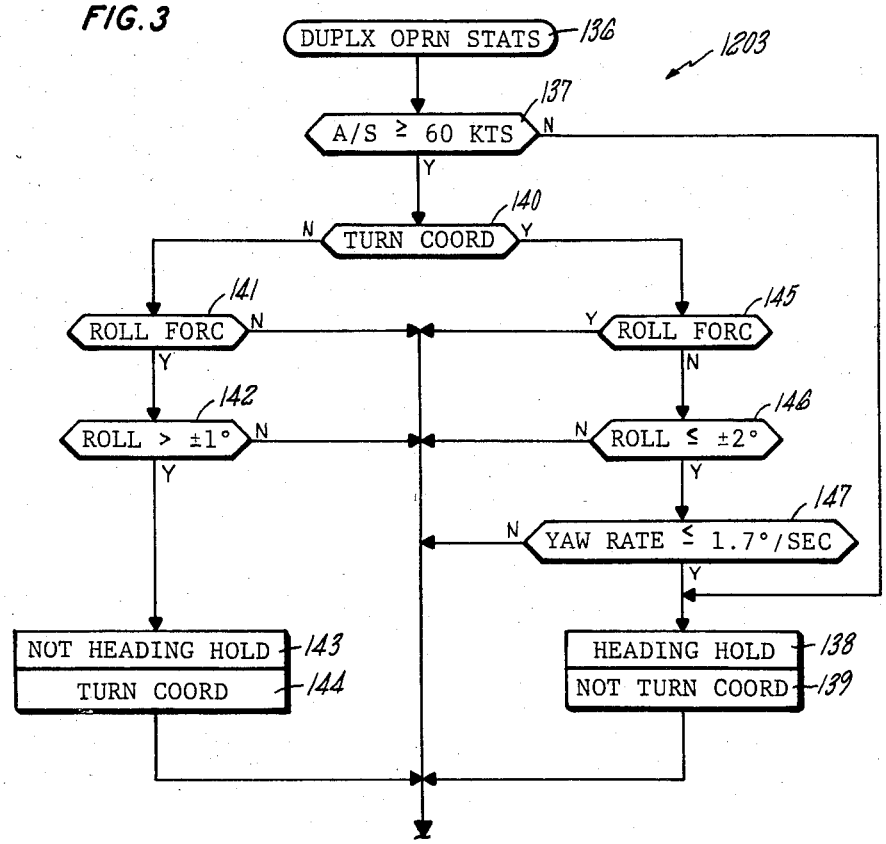
FIG. 3 is a logic flow diagram of an exemplary routine for selecting turn coordination and heading hold functions.

In FIG. 3, a partial subroutine, illustrative of subroutines which may be used to select between heading hold and turn coordination functions, insofar as the present invention is concerned, is illustrated as being performable within the duplex operational status subroutine 1203, referred to in FIG. 12 of the aforementioned patent. In FIG. 3, the duplex operational status subroutine 1203 may be reached through an entry point 136 and a first test 137 determines if the airspeed is greater than a threshold cruise speed, such as 60 knots, or not. If not, a step 138 sets the heading hold status and a step 139 resets the turn coordination status. This is due to the fact that heading hold can be used at any speed, but turn coordination is neither required nor used below 60 knots. If the aircraft drifts below 60 knots, the heading hold function is automatically selected. If the aircraft is going greater than 60 knots, an affirmative result of test 137 will reach a test 140 to determine if the turn coordination mode has been established. If it has not, a pair of tests 141, 142 determine if it should be established. Test 141 determines if the pilot is applying lateral force on the cyclic stick and a test 142 determines if the aircraft has more than a 1° bank angle. If both of these tests are affirmative, the heading hold status is reset in a step 143 and turn coordination status is set in a step 144. If either of the tests 141, 142 are negative, there is no change in the heading hold/turn coordination status and the duplex operation status subroutine 1203 proceeds with other steps (not shown, not germane to the present invention).

If test 140 indicates that the turn coordination status has been established, then a series of tests 145–147 are performed to determine whether reversion to heading hold should occur. If the pilot has removed lateral force from the cyclic pitch stick, test 145 will be negative, thereby reaching test 146 to determine if the aircraft roll angle is within 2° of wings-level. If so, test 147 is reached to determine if the yaw rate has been reduced to within 1.7° per second. If an affirmative result of test 147 is achieved, then step 138 will set the heading hold status and step 139 will reset the turn coordination status. But until the pilot removes lateral force from the cyclic stick, test 145 will be affirmative and the other tests will not be made. Even after removal of force, until a nearly wings-level attitude is achieved, test 146 will be negative so test 147 will not be made; and, until the yaw rate is low, test 147 will be negative; in each of these cases, the duplex operation status subroutine 1203 simply proceeds to other steps and tests (not shown, not related to the present invention).

Figure 4:
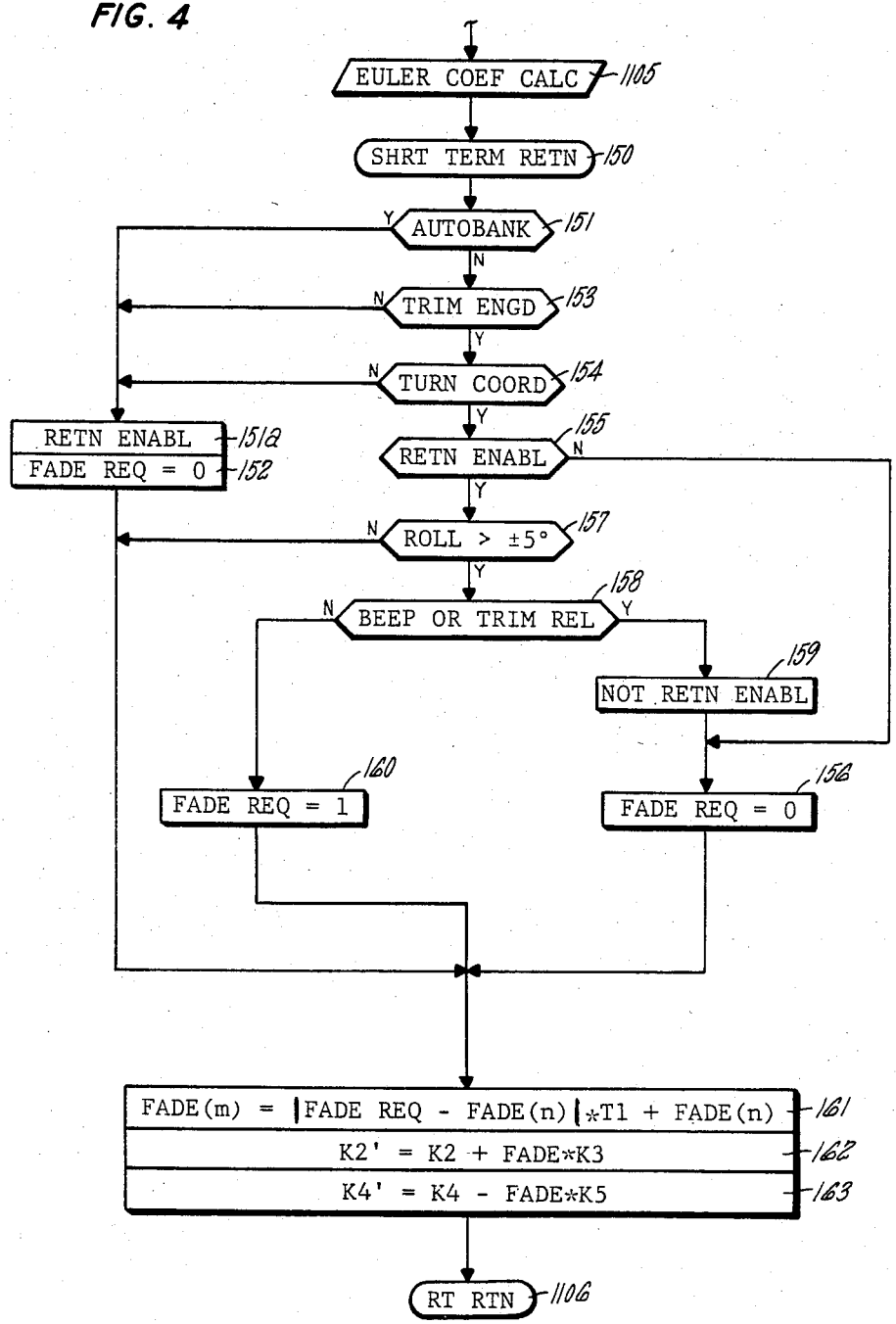
FIG. 4 is a logic flow diagram of an exemplary routine for selectively establishing short-term roll retention and providing adjusted gains, in a computer-implemented automatic flight control system incorporating the present invention.

Referring to FIG. 4, the short-term retention subroutine, which performs the logic equivalent to that below the dotted line 22 in FIG. 1, is illustrated as being performed within an autopilot routine referred to in FIG. 11 of the aforementioned patent, following the Euler coefficient calculation subroutine 1105 of the aforementioned patent. The short-term roll retention subroutine is entered through a transfer point 150 and a first test 151 determines if the autobank function is turned on. If it is, short-term retention cannot be utilized so a step 151a will set retention enable status (equivalent to the retention enable flip flop 101 in FIG. 1), and a step 152 will cause the fade request to be equal to zero (equivalent to the bistable device 112 being reset, in FIG. 1). If test 151 is negative, then a test 153 determines if trim is engaged or not. If it is, a test 154 determines if the turn coordination status has been established (as illustrated in FIG. 3) or not. A negative result of either test 153 or 154 will reach the steps 151a, 152 as described hereinbefore. Thus, short-term retention is enabled prior to when it can be utilized, either before trim is engaged, at level flight (without turn coordination), or during use of the autobank feature. However, when the autobank feature is not used, trim is engaged, and the conditions are present for turn coordination (above 60 knots, and a suitable roll angle), test 154 will be affirmative and a test 155 will determine whether the retention enable status has been set in step 151a or not. If not, short-term retention cannot be utilized, so a negative result of test 155 reaches a step 156 which sets the fade request equal to zero (in the same fashion as step 152).

On the other hand, an affirmative result of test 155 will cause a test 157 to determine if the roll angle is greater than 5°. If not, the fade request is simply left unaltered. But once the roll exceeds 5°, an affirmative result of test 157 reaches a test 158 to determine if either the lateral cyclic pitch beeper or the cyclic pitch trim release have been depressed. If either has, this is an indication that the pilot intends to control trim, rather than using the short-term retention of the invention; it is also an indication that the wings-level reference is no longer being maintained in the synchronizer, thereby rendering use of the invention impossible. In such a case, an affirmative result of test 158 reaches a step 159 to reset the retention enable status, and a step 156 to ensure that the fade request is zero. But if retention is enabled (test 155), a roll of more than 5° is involved (test 157) and there is no beep or trim release (test 158), then a negative result of test 158 will reach a step 160 in which the fade request is set to a one (in the same fashion as setting the bistable device 112 in FIG. 1).

When the short-term retention enable and fade request statuses are either determined or bypassed in each passage through the short-term retention subroutine of FIG. 4, the gain considerations (corresponding to the gain of the amplifiers 70, 71 in FIG. 1) may be accommodated. First, a step 161 can provide the desired fade, on a cyclic basis, beginning with zero fade, and after the fade request is set to one, causing an exponential increase until the fade in the nth cycle approaches one. Concomitantly, when fade request has been established (utilization of the present invention is in process) and the short-term retention is terminated (such as by going out of the turn coordination mode as the attitude returns to wings-level), the fade of the nth cycle is gradually reduced from one to zero by the process of step 161. One manner of implementing the invention is to provide substitute gains for K2 and K4 (illustrated in the amplifiers 61, 64 in FIG. 1) by including faded in and out values for K3 and K5 summed therewith. This may be achieved as illustrated in steps 162, 163 in FIG. 4. The gains K2' and K4' thus generated, to take into account fading in the functions equivalent to the amplifiers 70, 71 (or fading them out), may then be achieved in the roll inner loop and roll outer loop calculations which are performed digitally in the aforementioned patent. For instance, the roll outer loop calculation subroutine 1303 would simply use the gain factor K2' which would include faded in, faded out or in-between values of K3 summed therewith. And, the roll inner loop calculations, such as illustrated in FIG. 16, could provide the desired proportional inner loop control utilizing the gain factor K4', in a modified version of step 1604 which adds proportional hover augmentation and could equally add the proportional short-term retention simply by utilizing the modified gain K4' generated in step 163 herein. The other aspect of the invention provides a washout filter to the proportional portion prior to adding it to the roll stability rate portion. Thus providing the roll inner loop proportional portion, washed out and limited in a digital computer simply requires multiplying the roll error output of the synchronizer by K4', calculating a washed out filter version of it, and limiting it to ±5½% of authority. The washout filter is implementable digitally using the Tustin transform, as follows:

The washout function, y, of the variable x is:

$$y = \frac{ts}{ts + 1} x,$$

where t is the time constant.

$$y_n = (x_n - x_{n-1})T1 + y_{n-1}T2$$

where:

$$T1 = \frac{2t}{2t + \Delta T}$$

$$T2 = \frac{2t - \Delta T}{2t + \Delta T}$$

and

ΔT is the computer cycle period,
n denotes the current cycle,
n−1 denotes the preceding cycle.
The values of $x_{n-1}$ and $y_{n-1}$ are updated at the end of each cycle:

$$x_{n-1} = x_n$$

$$y_{n-1} = y_n$$

This may all be implemented using any well known programming techniques suited to the particular computer being used.

The invention allows the pilot control, by lateral position of the cyclic pitch stick, the nominal roll angle during a turn against trim. He must maintain a suitable bank angle to provide the desired turn against trim. The wings-level position is being retained in the synchronizer so that the pilot knows that he will return to wings-level once he removes lateral force from the stick. While in such a turn, however, not only are rates dampened (by the roll rate gyro output) but also attitude errors are corrected rapidly by the roll inner loop channel, using only the short term variations in the roll error output of the synchronizer during the turn against trim. This use is permitted because the washout filter responds only to changes in the roll attitude error, rather than to the long-term roll attitude error. As described principally with respect to FIG. 1, but also with respect to FIG. 4, the invention is readily implemented by simply providing an increase in gain to the roll outer loop stability channel, and a washout version of decreased gain in the roll inner loop stability channel.

The washout filter 72 (or equivalent digital filtering when implemented with a computer) should be such as to react only to changes in the roll error output of the synchronizer on the line 56 so as to stabilize the aircraft against external perturbations. For instance, when a wind gust alters the roll attitude of the aircraft, the output of the roll rate gyro 67 (the functions of FIG. 16 of the aforementioned patent) will stabilize the aircraft and bring its rate to zero. But, during the rate, there is an integration in the change of roll attitude; in order to take this out without high pilot workload, that attitude change will pass through the washout filter 72 and cause the roll inner loop to make an attitude adjustment as well. But, the long-term roll error out of the synchronizer 56 (which is significant and relatively constant during a turn against trim) will have no effect on the inner loop due to the washout nature of the filter 72. It should be noted that the washout filter 72 (FIG. 1) does not affect the proportional roll stability function of the inner loop during straight and level flight, or during hover. This is simply because the washout filter has a sufficient envelope to accommodate the relatively short-term signals which are passed through the amplifier 64. In other words, the aircraft operation will normally be the same with or without the washout filter in it, except during use of the invention in turns against trim as described hereinbefore. Thus there is no need to switch the filter in and out. However, in a given implementation of the present invention, if it were found that the filter altered stability characteristics in other than turns against trim, the fade request signal could be used to switch the filter in and out.

As is illustrated by the summing junctions 63 and 63' in FIG. 1 and by steps 162 and 163 in FIG. 4, the gain of the roll outer loop retention channel is increased by adding the gain of the amplifier 70 (K3) to that of the amplifier 61 (K2), whereas the gain of the roll inner loop stability channel is decreased by subtracting the gain of the amplifier 71 (K5) from the gain of the amplifier 64 (K4). This is to ensure that, when the pilot removes lateral force from the cyclic pitch stick, the 8% limited roll error signal will be sufficient to drive the aircraft back to a wings-level condition, without the roll inner loop reacting to the attitude change and countermanding it successfully. Because of the washout filter, the long-term roll error is not seen in the inner loop; only short-term changes are seen. Thus, when the pilot removes force from the stick, the inner loop sees a deviation towards wings-level and introduces a countermanding input. In other words, any tendency of the roll inner loop (amplifier 64) to countermand the attitude change resulting from the roll outer loop (amplifier 61) must be limited, so that the roll outer loop will dominate and return the aircraft to wings-level in a reasonable time once the pilot removes lateral force from the stick. But, depending on the characteristics of the particular aircraft and automatic flight control system in which the invention is used, different gain adjustment or no adjustment at all may be appropriate.

The invention is shown as being logically engaged and disengaged, in a normal case, by means of the turn coordination signal simply because this signal has in it information useful to determine when a turn against trim is being made and when it is completed. Thus the fade request signal is a signal indicative of a turn against trim. Also, the beginning and ending of turn against trim in accordance with the invention is disclosed herein as simply calling for a fade up or a fade down of gain adjustments which are required in order to ensure adequate stability, yet to ensure diligent return to wings-level once the pilot removes force from the stick. The gain adjustments are necessary in order to ensure that it will not take an unreasonable time to return to wings-level due to the countermanding commands made through the washed-out roll inner loop (amplifier 64) while at the same time providing sufficient gain for adequate stability at other times. If gain adjustment is not needed in a given aircraft, the invention may be practiced simply by providing a washout filter with a suitable time constant in a proportional path of a roll inner loop stability channel of a flight control system.

The invention has been described in terms of a system having a roll stability inner loop actuator 25 distinct from the roll attitude retention outer loop actuator 29. However, the invention may be practiced by providing suitable control over the respective inputs of a single actuator which provides both the limited authority, rapid response of the roll stability inner loop actuator 25 and the slower, full authority response of the roll attitude retention outer loop actuator 29.

The time constant (T1) which may be used in a lag filter 117 (FIG. 1) or in an algorithm (161, FIG. 4) for fading the gain adjustments in and out will vary from one system to another, but may be on the order of one-half to two seconds. The time constant (T2) of the washout filter will also vary from one aircraft to another, and may vary depending upon the particular actuators and other ancillary equipment used. However, the time constant T2 should be selected so as to react only to short-term attitude changes during turns against trim, and, if desired, to allow reaction to short-term influences of gusts and the like when not in a turn against trim. However, T2 may typically be chosen to be between one and five seconds.

Thus, although the invention has been shown and described with respect to exemplary embodiments thereof, it should be understood that the foregoing and various other changes, omissions and additions may be made therein and thereto, without departing from the spirit and the scope of the invention.

We claim:

1. An aircraft automatic flight control system comprising:
    a vertical gyro providing a roll axis output signal indicative of the direction and magnitude of bank angle of the aircraft with respect to level;
    roll control means, including a pilot control stick and actuator means including a roll attitude retention outer loop portion and a roll stability inner loop portion, for providing commands to the control surfaces of the aircraft for controlling the roll attitude of the aircraft, lateral force on said control stick providing input commands to said control surfaces which override input commands related to the positioning of said roll attitude retention outer loop portion; and
    signal processing means responsive to said roll axis output signal of said vertical gyro and connected to said roll control means, for selectively providing a desired roll attitude reference signal, for providing a roll error signal indicative of the difference in roll attitude indicated by said desired roll attitude reference signal and said roll axis output signal, responsive to said roll control means for providing a signal indicative of lateral force in excess of a predetermined threshold magnitude being applied to said control stick, for providing to said roll attitude retention outer loop portion a first roll command signal which is a first proportional function of said roll error signal in response to the presence of said force signal and which is both said first proportional function and an integral function of said roll error signal in response to the absence of said force signal, for providing a second roll command signal to said roll stability inner loop portion which is a second proportional function of said roll error signal;

characterized by:
    said signal processing means providing said second roll command signal to said roll stability inner loop portion which is a washed out proportion of said roll error signal, whereby a turn induced by lateral force applied to said control stick against a trim position established by said roll attitude retention outer loop portion in response to said roll error signal will be stabilized by said roll stability inner loop portion responding to said washed out function of said roll error signal to stabilize the aircraft against attitude perturbations which result in short-term changes in said roll error signal.

2. An aircraft automatic flight control system according to claim 1 characterized by said signal processing means being responsive to said roll error signal and to said force signal to provide a turn against trim signal indicative of a roll angle in excess of a predetermined threshold magnitude being established by lateral force of the stick, against a trim attitude established by said roll attitude retention outer loop portion in response to said roll error signal, and for providing, in response to presence of said turn against trim signal, said first and second roll command signals with the ratio of said first proportional function to said second proportional function being greater than the ratio thereof in the absence of said turn against trim signal.

3. An automatic flight control system according to claim 2 characterized by said signal processing means being responsive to the absence of said force signal and said roll error signal indicating an aircraft roll attitude of less than a predetermined termination magnitude to cease providing said turn against trim signal.

* * * * *